Dec. 27, 1955  F. E. HOLLADAY  2,728,145
SCREW GAUGE
Filed March 20, 1953  2 Sheets-Sheet 1
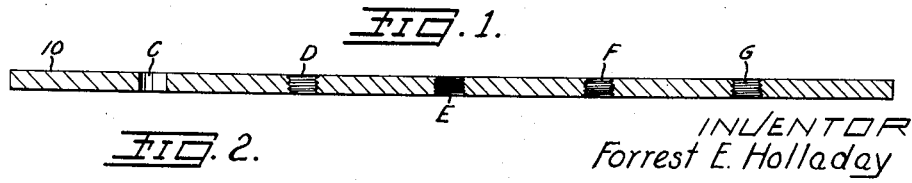
INVENTOR
Forrest E. Holladay
BY
Cook and Schermerhorn
ATTORNEYS Dec. 27, 1955  F. E. HOLLADAY  2,728,145
SCREW GAUGE
Filed March 20, 1953  2 Sheets-Sheet 2

INVENTOR
Forrest E. Holladay
BY
Cook and Schermerhorn
ATTORNEYS

United States Patent Office 2,728,145
Patented Dec. 27, 1955

2,728,145

SCREW GAUGE

Forrest E. Holladay, Portland, Oreg.

Application March 20, 1953, Serial No. 343,589

2 Claims. (Cl. 33—199)

This invention relates to improvements in gauges for determining hole sizes and thread types associated with the most commonly used varieties of screws and small bolts.

In purchasing a particular type of screw or bolt from a hardware store or the like, it may be necessary to designate certain specifications of the screw by the National Machine Screw size or fractional size and also by the thread series, with reference to National Coarse (NC), National Fine (NF) or some not standard (NS) but widely used and recognized thread. The National Machine Screw numbering system, which represents the nominal size, includes screw sizes from 0 to 14. Screw sizes are also identified by their major diameter in inches or fractions thereof from 1/16 up, and by metric or other systems of identifying standardized or widely used sizes. In regard to the thread series, the National Coarse and the National Fine each specifies a certain number of threads per inch for a particular size of screw, the fine series having more threads per inch on each size of screw, than the course series. "Not standard" applies to widely used and recognized threads that do not fall in either of the above standard series.

Very frequently a purchaser or user wishes to duplicate a particular sample at hand where the nominal diameter or size number and the thread series or number of threads per inch are not known. If a matching nut of known size and thread is not at hand, resort must be had to some kind of a gauge or caliper to obtain the necessary data for determining the specification of the screw to be so duplicated or furnished.

It is now common practice to attempt to fit a nut to a screw to be duplicated without first definitely determining the base size of the screw. Because the diameter change for each number is only .013" this can result in a nut feeling like it fits, yet actually being one size different and having a different thread, resulting in the thread stripping when pressure is applied on the thread when tightening. Thus, repair and service men often use a wrong size screw, usually selected from miscellaneous stock, because there has been no means of definitely establishing the correct specifications, particularly on small sizes in short lengths.

Frequently, also, a purchaser wishes to buy, or select from his drill holder, a drill and tap to make threaded holes in a member to fit a particular screw of unknown size and thread. Drills for such purposes are designated by a series of nominally numbered or fractional sizes, and letters, for identification. Taps for making internal threads are identified by nominal size numbers or fractions of an inch, and also as either National Coarse or National Fine series. Special threads are made by special taps carrying some different designation, referred to by the trade as "not standard." In order to drill a hole and tap it to fit a particular screw, all these data must be known exactly. Here again, if the storekeeper or user does not have on hand a nut of known size and thread matching the specimen, direct measurement must be attempted in order to provide specifications for the proper drill and taps for his purpose.

Conventional serrated screw gauges for this purpose are difficult to apply and read accurately on fine threads, particularly where only a short length of threaded surface is available to compare, and closely similar thread types are difficult to distinguish. This makes it difficult to measure and catalogue a given specimen of screw for the purpose of duplicating a screw or determining drill and tap sizes to make internal threads for the screw. Frequently, after specifications are established by such measurements, it is found that the screws, drills, or taps do not correspond with the specimen in some detail and cannot be used.

The general object of the present invention is, therefore, to provide an improved gauge to facilitate determining complete specifications of a screw of unknown size and having an unknown number of threads per inch.

Another object is to provide a gauge having means to determine the size of drill to be used for boring a clearance hole for a given screw of unknown size, and means to indicate the particular drill and tap to be used for making a threaded hole to fit such a specimen.

Another object is to provide a gauge of simple construction which is convenient and easy to use and which will practically insure against error in determining the size and thread specifications of any commonly used type of screw. Another object is to provide a gauge which may be used for cutting screws accurately to a predetermined length.

The present gauge is thus intended primarily for use by hardware stores, machine shops, service and repair personnel and the like, for the purposes described. In general, the gauge comprises a plate having an orderly arrangement of holes accompanied by indicia relating to the nominal sizes of screws and drills and the number of threads per inch in the several thread series. Certain of the holes are smooth to comprise a body check to determine the outside diameter of the threads, and hence the diameter of a clearance hole for the screw, while the other holes are tapped with the various types of threads indicated on the gauge. The arrangement of the holes, preferably in vertical columns and horizontal rows, makes it a simple matter to determine the size and thread type of any specimen by merely finding the smallest smooth hole into which the screw can be inserted and then finding directly opposite and to the right the particular threaded hole for that screw size having threads to fit those of the specimen. The gauge thus provides complete information on any series or combination of sizes desired to be so treated in a small space.

Servicing, repair, and like personnel customarily carry an assortment of screws from which replacements are made which may require information as developed by this tool. Positive identification of size and thread is essential to good workmanship, cutting to length is also much required and easily accomplished by the present tool.

Although the pitch of fine threads is very difficult to measure accurately by the usual serrated or toothed type of gauge, the proper fit in a tapped hole can readily be determined without any particular skill or effort. The engagement or attempted engagement of only a relatively few threads is sufficient to indicate immediately if the thread in the hole corresponds to the thread on the screw. Binding occurs in less than 1/8 inch thickness of plate, if the numbers of threads per inch are not the same and, since size is first definitely established by smooth hole fitting, and a screw will only fit one of the holes opposite the smooth hole in which the screw fitted, no error in determining the exact and complete specifications of a screw can occur as long as simple instructions are followed. The gauge provides complete supporting data including drills to be used and basic diameter if a screw is to be made, which often occurs in service work.

The invention will be better understood and additional objects and advantages will become apparent from the following description taken in connection with the accompanying drawings which illustrate a preferred form of the device. It is to be understood, however, that the invention may take other forms and that all modifications and variations within the scope of the appended claims, which will occur to persons skilled in the art, are included in the invention.

In the drawings:

Figure 1 is a top plan view of a preferred form of gauge of the present invention;

Figure 2 is a sectional view taken on the line 2—2 of Figure 1;

Figure 3:
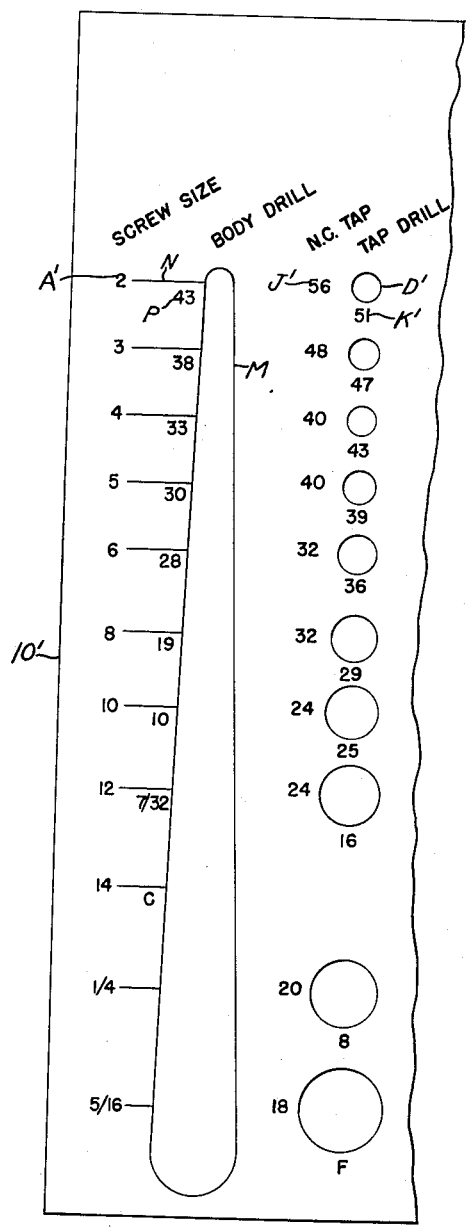
Figure 3 is a top plan view of a modified form of gauge.

Referring to Figures 1 and 2, a preferred form of the gauge comprises a hardened plate 10 of metal or other suitable material of a thickness such that certain tapped holes are deep enough to contain a sufficient number of threads to bind on any screw having a different number of threads per inch. A plate thickness of ⅛ inch in metal has been found to be satisfactory for carrying out the purposes of the invention.

Printed or stamped adjacent the left-hand edge of the plate is a column A of figures which represent the size of the screw. The column is identified by the heading of "Screw Size," and includes nominal screw sizes from 2 to 14 and fractional sizes of screws larger than 14. The fractional sizes represent the major diameter in inches, and, for convenience, fractional size in inches may be printed or stamped in addition to and adjacent the nominal screw size, as is shown for the No. 5 and No. 10 screws. Adjacent the right-hand edge of the plate is a column B of figures representing the corresponding decimal designating the outside diameter in inches of the screw in column A, the column B being identified by the heading of "Basic O. D." By way of example, a No. 2 National Machine Screw has a basic outside diameter of .086 inch.

Adjacent the column of figures A is a column of drilled holes C of different diameters. The holes in this column comprise a body check and have smooth walls, each hole being in horizontal alignment with a figure designating a screw size in column A. Each of the holes in the column C shows a drill number size or letter C₁ which is printed or stamped immediately below the hole. This indicium relates to the clearance or body drill for that size screw, and these smoothly drilled holes are adapted to provide a clearance fit for the screw size horizontally alined therewith in columns A and B. For example, a No. 43 drill will make the smallest hole into which a No. 2 screw can be inserted by hand; and it is seen that, by referring to the gauge, a proper drill size is easily determined for providing a clearance fit for any screw size desired.

To the right of the column of holes C are additional columns of holes, D, E, F, and G, and each of the holes in these columns is tapped. The column D has threads specified as National Coarse, the column E has threads specified as National Fine, and the two columns F and G have other threads which are not standard, but widely recognized and used.

Each of the tapped holes in columns D, E, F and G is identified by columns of numbers J and K. The numbers J appear to the left of the hole and designate the number of threads per inch in the hole, and the numbers K appear immediately below the hole and designate the drill size for making the hole before it is tapped, the drill size being designated by whole numbers, fractions, or letters, according to the practice in the particular standard. The columns identified by reference numeral J carry the series of the thread tap, such as: NC TAP, NF TAP, NS TAP, NS TAP. Heading each column above K appear the indicia Tap Drill. Thus, on the face of the plate, all indicia are fully explained and classified.

As stated, the columns F and G contain holes tapped with threads that are not standard, each of the columns being so designated by the heading above the K figures. The size and number of threads per inch of these specially tapped holes may be provided to receive screws which are widely recognized and used but do not fall in either of the standard classifications. Additional columns of holes may be provided for metric screws.

One of the important objects of the present gauge is to match the size and threads per inch of a screw or bolt, i. e., to determine the number and threads thereof, so that a like screw or bolt may be specified. To accomplish this purpose, the screw to be matched is first fitted in the smallest hole possible in the column of smooth-walled holes C. If a No. 4 screw were to be matched, it would fall first into the hole in column C immediately to the right of "4" in column A, assuming, of course, that the fitting operation was started at the top and proceeded downwardly. The proper size being determined, the screw is then threaded by trial and error into the holes horizontally alined with the smoothly drilled No. 4 hole until the tapped hole with corresponding threads is found. It will be found that only one threaded hole in this horizontal row will fit the screw, permitting it to be screwed through the plate without excessive tightness.

After the tapped hole has been located which has threads to fit the screw, the indicated size screw having the indicated number of threads per inch can be taken from stock or specified in a written order. For example, if the screw fits freely (but will not pass through the hole above) in hole No. 4 in column C and is found to have the same threads as the hole in the adjacent column D, the screw is designated as No. 4 screw having 40 threads per inch, reduced in practice to 4–40. As stated, the columns F and G contain holes tapped with threads that are not standard, each of the columns being so designated by the heading above the K figures.

If it is desired to provide a threaded hole for any desired screw, the size and thread are first determined by the above-described method. Reference to the numeral immediately below the hole and to the left of the hole will give the drill size and tap size for drilling and tapping the hole, respectively. Further, if a clearance hole for the screw is to be made, the number of the drill to be used is designated immediately therebelow. If the screw must be made, the basic diameter reference appears in column B.

The embodiment of Figure 3 comprises a plate 10' provided with body check means in the form of a tapering slot M adjacent a column of screw sizes A'. Between the slot M and each of the indicia designating screw sizes in column A' is a column of horizontal index marks N, and immediately under these marks is a drill number or letter P which designates the clearance or body drill size. These marks indicate the point in the slot where the width of the slot equals the diameter of the screw designated by its nominal screw size in column A' at the other end of the index mark.

The slot M is used as a scale, and when determining the size and threads per inch of a screw, the screw is first inserted in a portion of the slot M wider than the diameter of the screw. The screw is then moved upwardly until it binds in the slot wherein the screw will be diametrically aligned with an index mark. At the left end of the particular index mark is the screw size, and immediately below that particular index mark is the body drill size. To the right of the slot M is a horizontal line of threaded holes to determine the number of threads per inch. These holes are arranged in vertical columns as in Figure 1, one of said columns being shown in Figure 3 and designated as D'. Each of these columns has identifying numerals or indicia J' and K' adjacent thereto, the numerals J' appearing to the left of each hole and designating the number of threads per inch in the hole, and the numerals K' appearing immediately below the hole and designating the drill size for making the hole before it is tapped.

Figure 4:
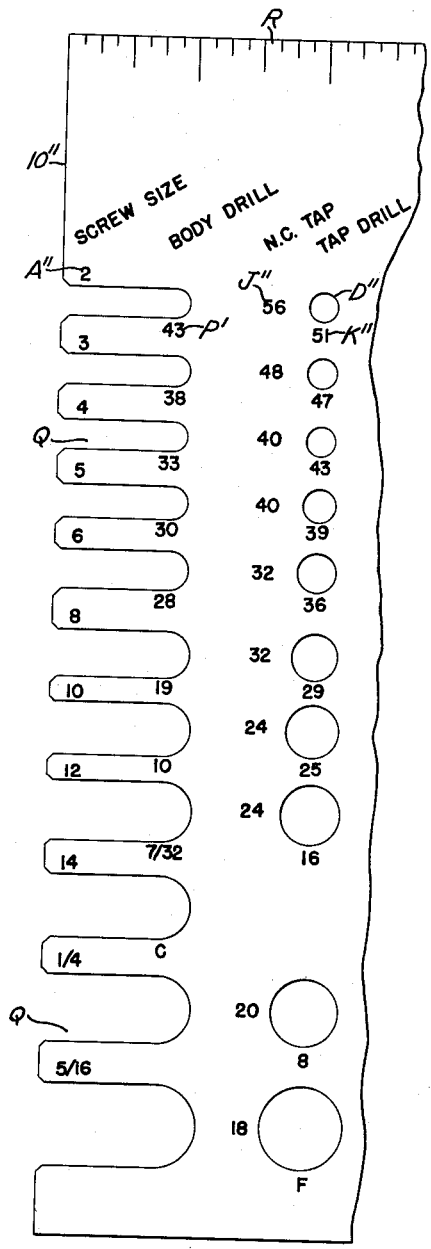
Figure 4 is a top plan view of a further modification.

A further embodiment, shown in Figure 4, comprises a plate 10" having body check means for a screw in the form of a plurality of transverse slots or openings Q. Immediately above each of said slots and at the left-hand edge of the plate is a nominal screw size A" and immediately below each of said slots adjacent its closed end is a drill number or letter P' designating the clearance or body drill size.

A screw to be matched in size or threads per inch is first fitted in the smallest possible slot Q whereby the nominal screw size may be determined by referring to the numeral A" immediately above the slot engaged by the screw, and the clearance drill size may be determined by referring to the numeral P' immediately below the slot. Having determined the proper size of the screw, it is then threaded by trial and error into threaded holes in a horizontal line to the right of the slot Q until a thread is found which fits the screw, one column of these holes being shown and designated as D". Threads per inch and size of drill for making the hole to be tapped may be determined by indicia J" and K" adjacent each hole. The plate 10" is provided with a scale R for measuring the length of screws or bolts.

Another important use of the present gauge is to provide a means for accurately cutting screws to a predetermined length as short as 1/8 inch. After threading a screw into its properly matched threaded hole, it may be measured to the desired length from the face of the plate, subtracting the plate thickness. With the plate held in a vise, a pin shear is used on the back side of the plate, shearing the screw flush with the plate, after which it may be removed with the fingers since the threaded hole protects the threads from distortion while shearing. Also, the screw may be cut with diagonal cutters or similar tools, any thread distortion being corrected when the screw is removed through the hardened plate. Filing the end of the screw after cutting with a diagonal cutter is desirable and the plate acts as a holder for the screw while such filing is done, with no possible chance of injuring threads or head as when held in a vise, pliers or similar gripping tool.

The gauge is not limited to a rectangularly shaped plate with the holes disposed in vertical columns and horizontal rows as circular or other convenient coordinate arrangements may be used.

Having now described my invention and in what manner the same may be used, what I claim as new and desire to protect by Letters Patent is:

1. A screw gauge comprising a plate having a coordinate arrangement of holes in a plurality of lines, the holes in one line being smooth bore and graduated in size to gauge the outside diameter of a threaded screw shank and the holes in the other lines being tapped for threaded engagement with screws, said tapped holes being disposed in groups extending across said lines and each group including one of said smooth bore holes, the tapped holes in each group having different threads corresponding to the different threads on screws having the diameter of the smooth bore hole in the group, individual indicia for all of said holes disposed in one relation to said holes designating the size of drill to make each hole, and individual indicia for all of the tapped holes disposed in a different relation to the holes designating the number of threads per inch.

2. A gauge for determining the size and thread of a screw and the like comprising a plate having a plurality of vertical columns, each column comprising a series of holes, the holes in at least one of said columns being threaded and having a figure adjacent each said hole to indicate the size of drill required to make said hole and another figure adjacent each said hole to indicate the size of tap required to thread said hole, a column of vertically arranged clearance holes having a figure adjacent each said hole to indicate the size of drill required to make said hole and another figure adjacent said hole to indicate a screw size of largest possible thread diameter which will readily pass through said clearance hole, said holes also being arranged in horizontal columns for readily determining the thread diameter of a screw and data for making a threaded hole to receive said screw.

References Cited in the file of this patent
UNITED STATES PATENTS

| | | |
|---|---|---|
| 447,475 | Pomeroy | Mar. 3, 1891 |
| 1,881,651 | Judge | Oct. 11, 1932 |
| 2,528,431 | Greenberg | Oct. 31, 1950 |

OTHER REFERENCES

Stewart Screw and Nut Locator, advertising publication by Stewart Mfg. Co., Washington 9, D. C. (Copy in Div. 66, received January 7, 1947.)